United States Patent
Lancaster

(10) Patent No.: US 8,538,865 B2
(45) Date of Patent: Sep. 17, 2013

(54) METHOD OF DETERMINING PRIOR NET BENEFIT OF OBTAINING ADDITIONAL RISK DATA FOR INSURANCE PURPOSES VIA SURVEY OR OTHER PROCEDURE

(75) Inventor: Clifton J. Lancaster, Avon, CT (US)

(73) Assignee: The Hartford Steam Boiler Inspection and Insurance Co., Hartford, CT (US)

(*) Notice: Subject to any disclaimer, the term of this patent is extended or adjusted under 35 U.S.C. 154(b) by 1430 days.

(21) Appl. No.: 11/509,266

(22) Filed: Aug. 24, 2006

(65) Prior Publication Data

US 2007/0043662 A1    Feb. 22, 2007

Related U.S. Application Data

(63) Continuation-in-part of application No. 11/323,252, filed on Dec. 30, 2005, now Pat. No. 7,698,213.

(60) Provisional application No. 60/709,634, filed on Aug. 19, 2005.

(51) Int. Cl.
G06Q 40/00    (2012.01)

(52) U.S. Cl.
USPC ........................... 705/38; 705/35; 705/4

(58) Field of Classification Search
USPC ............................ 705/35, 38, 4
See application file for complete search history.

(56) References Cited

U.S. PATENT DOCUMENTS

| | | | | |
|---|---|---|---|---|
| 5,926,800 A * | 7/1999 | Baronowski et al. | ............ | 705/35 |
| 7,246,070 B2 * | 7/2007 | Schwartz et al. | ............ | 705/4 |
| 7,319,970 B1 * | 1/2008 | Simone | ............ | 705/4 |
| 7,415,433 B2 * | 8/2008 | Huneault | ............ | 705/36 R |
| 7,454,377 B1 * | 11/2008 | Beaumont | ............ | 705/36 T |
| 7,487,435 B2 * | 2/2009 | Aviv | ............ | 715/205 |
| 7,599,848 B2 * | 10/2009 | Wefers et al. | ............ | 705/7.28 |
| 8,010,387 B2 * | 8/2011 | Porter et al. | ............ | 705/4 |
| 8,041,585 B1 * | 10/2011 | Binns et al. | ............ | 705/4 |
| 2004/0044617 A1 * | 3/2004 | Lu | ............ | 705/38 |
| 2004/0103013 A1 * | 5/2004 | Jameson | ............ | 705/7 |
| 2004/0260703 A1 * | 12/2004 | Elkins et al. | ............ | 707/100 |
| 2005/0004833 A1 * | 1/2005 | McRae et al. | ............ | 705/11 |
| 2005/0075919 A1 * | 4/2005 | Kim | ............ | 705/10 |
| 2005/0187845 A1 * | 8/2005 | Eklund et al. | ............ | 705/36 |
| 2005/0187849 A1 * | 8/2005 | Bollapragada et al. | ............ | 705/36 |
| 2005/0197952 A1 * | 9/2005 | Shea et al. | ............ | 705/38 |
| 2006/0004682 A1 * | 1/2006 | Danielson et al. | ............ | 706/52 |
| 2006/0253709 A1 * | 11/2006 | Cheng et al. | ............ | 713/182 |
| 2006/0287892 A1 * | 12/2006 | Jones et al. | ............ | 705/4 |
| 2007/0021987 A1 * | 1/2007 | Binns et al. | ............ | 705/4 |
| 2007/0136104 A1 * | 6/2007 | Bowen et al. | ............ | 705/4 |
| 2008/0027774 A1 * | 1/2008 | Jameson | ............ | 705/7 |
| 2011/0161245 A1 * | 6/2011 | Hollas | ............ | 705/36 R |

* cited by examiner

*Primary Examiner* — Gregory Johnson
(74) *Attorney, Agent, or Firm* — McCormick, Paulding & Huber LLP

(57) ABSTRACT

A method is disclosed for determining the prior net benefit of obtaining data relating to an individual risk in an insurance portfolio, via a survey or similar procedure. A risk model is developed at the individual risk level for mathematically estimating the probability of expected loss given a set of information about the risk. The risk model is incorporated into a profitability model. A probability distribution relating to the type of survey information to be obtained is developed, which is used for determining the gross value of obtaining the information. The method produces as an output a quantitative estimation (e.g., dollar value) of the net benefit of obtaining survey data for the risk, calculated as the gross value of the survey less the survey's cost, where the benefit of the survey relates to a quantitative increase in predictive accuracy resulting from incorporating the survey data into the predictive model.

20 Claims, 4 Drawing Sheets

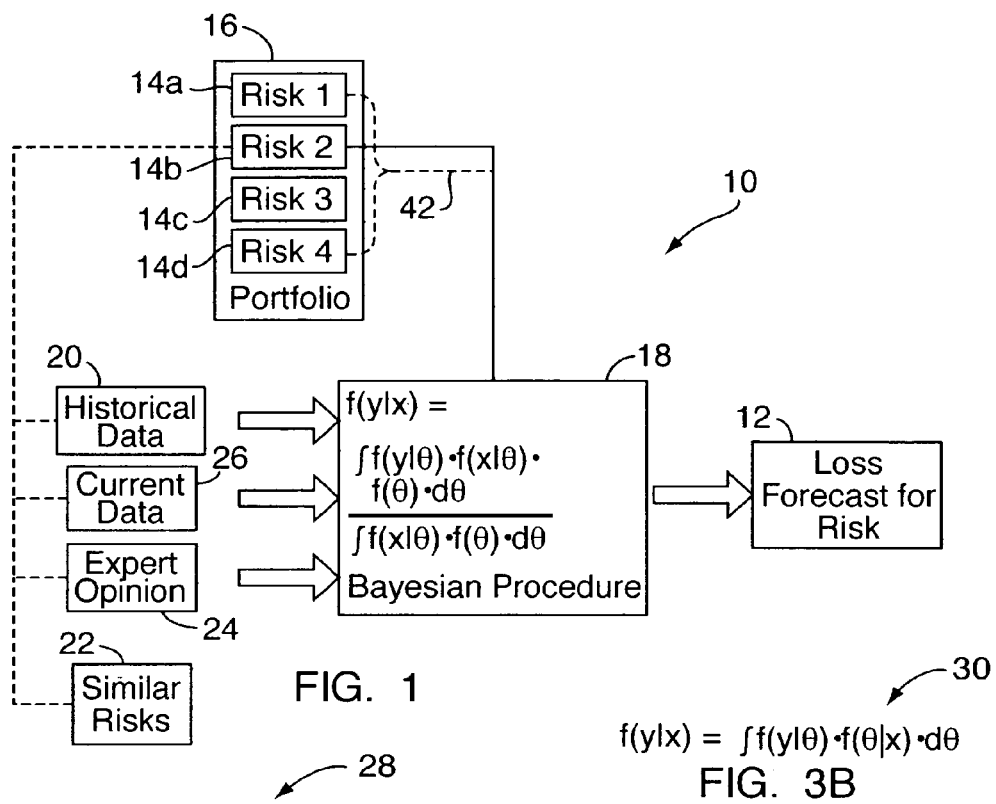

FIG. 1

$$f(y|x) = \frac{\int f(y|\theta) \cdot f(x|\theta) \cdot f(\theta) \cdot d\theta}{\int f(x|\theta) \cdot f(\theta) \cdot d\theta}$$

FIG. 3A $$f(y|x) = \int f(y|\theta) \cdot f(\theta|x) \cdot d\theta$$

FIG. 3B $$f(\theta|x) = \frac{f(x|\theta) \cdot f(\theta)}{f(x)}; \quad f(x) = \int f(x|\theta) \cdot f(\theta) d\theta$$

FIG. 3C $$N(t) \quad \{Y(t) : t \geq 0\};$$
$$Y(t) = \sum_{i=0} X_i; \{N(t) : t \geq 0\};$$
$$\{D_i : i \geq 0\};$$

FIG. 3D $$Z = \sum_{i=0}^{N} (X_i - \text{deductible})_t$$

FIG. 3E $$E(Z) = E\left(\sum_{i=0}^{N} (X_i - \text{deductible})_t\right)$$
$$= E(N) \, E\left((X - \text{deductible})_t\right)$$

FIG. 3F $$f(\text{future losses}|\text{past losses}) = \frac{\int f(\text{future losses}|\theta) \cdot f(\text{past losses}|\theta) \cdot f(\theta) \cdot d\theta}{\int f(\text{past losses}|\theta) \cdot f(\theta) \cdot d\theta}$$

FIG. 3G $$p(\text{future}_j|\text{past losses}) = \frac{\int p(\text{future}_j|\theta) \cdot p(\text{past losses}_{ALL}|\theta) \cdot p(\theta) \cdot d\theta}{\int p(\text{past losses}_{ALL}|\theta) \cdot p(\theta) \cdot d\theta}$$

FIG. 3H

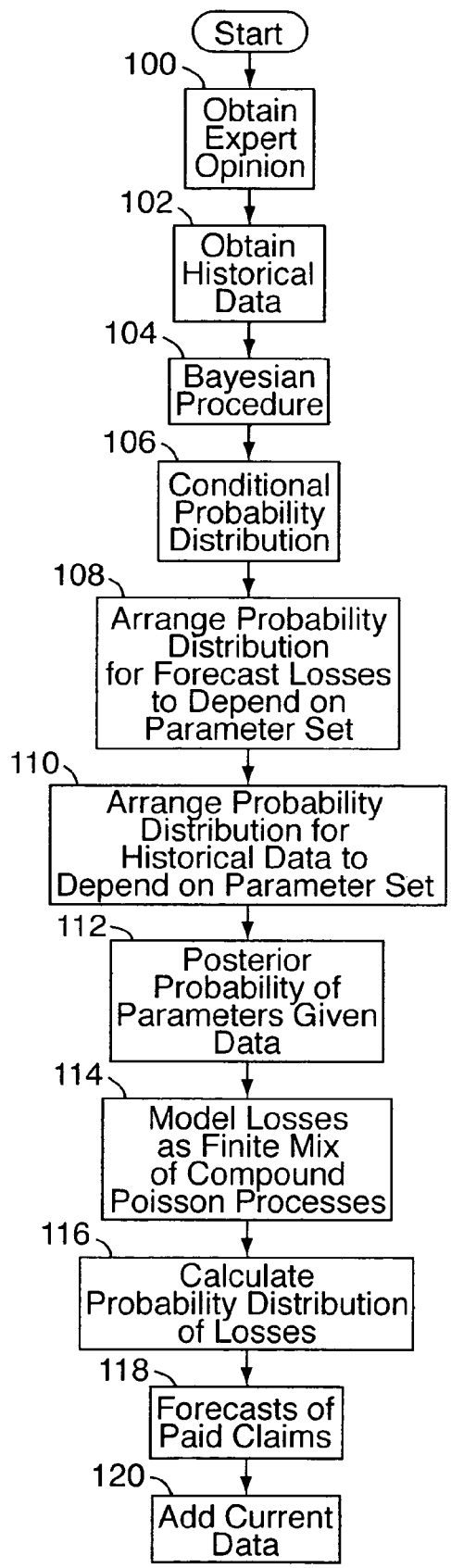
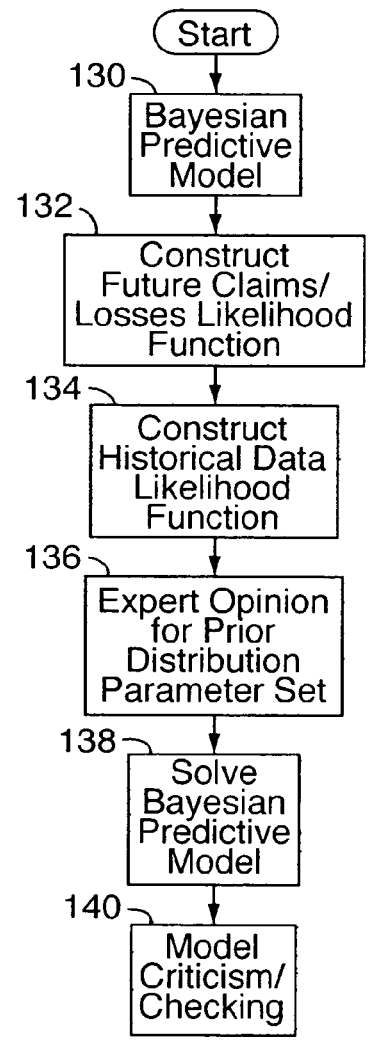
FIG. 2
FIG. 5

$$p(cl1|cv1,rm1,ev1,cl0,cv0,rm0,ev0) =$$

$$\frac{\int p(cl1|cv1,rm1,ev1,cl0,cv0,rm0,ev0,\theta) \cdot p(cl0|cv1,rm1,ev1,cv0,rm0,ev0,\theta) \cdot p(\theta|cv1,rm1,ev1,cv0,rm0,ev0) d\theta}{\int p(cl0|cv1,rm1,ev1,cv0,rm0,ev0,\theta) \cdot p(\theta|cv1,rm1,ev1,cv0,rm0,cv0) d\theta}$$

FIG. 4A $$\frac{\int p(cl1|cv1,rm1,ev1,\theta) \cdot p(cl0|,cv0,rm0,ev0,\theta) \cdot p(\theta) d\theta}{\int p(cl0|cv0,rm0,cv0,\theta) \cdot p(\theta) d\theta}$$

FIG. 4B $$\frac{\exp(-z\lambda)(z\lambda)^N}{N!} f(x_1)f(x_2)...f(x_N)$$

FIG. 4C

METHOD OF DETERMINING PRIOR NET BENEFIT OF OBTAINING ADDITIONAL RISK DATA FOR INSURANCE PURPOSES VIA SURVEY OR OTHER PROCEDURE

CROSS-REFERENCE TO RELATED APPLICATIONS

This is a continuation-in-part of U.S. patent application Ser. No. 11/323,252, filed Dec. 30, 2005, which claims the benefit of U.S. Provisional Application Ser. No. 60/709,634, filed Aug. 19, 2005.

FIELD OF THE INVENTION

The present invention relates to data processing and, more particularly, to an automated electrical financial or business practice or management arrangement for insurance.

BACKGROUND OF THE INVENTION

Generally speaking, commercial insurance is a form of risk allocation or management involving the equitable transfer of a potential financial loss, from a number of people and/or businesses to an insurance company, in exchange for fee payments. Typically, the insurer collects enough in fees (called premiums) from the insured to cover payments for losses covered under the policies (called claims), overhead, and a profit. Each insured property or item, such as a plot of land, a building, company, vehicle, or piece of equipment, is typically referred to as a "risk." A grouping of risks, e.g., all the properties insured by an insurer or some portion thereof, is called a "portfolio."

At any particular point in time, each portfolio of risks has an associated set of past claims and potential future claims. The former is a static, known value, while the latter is an unknown variable. More specifically, for a given portfolio in a given time period, e.g., one year, there may be no claims or a large number of claims, depending on circumstances and factors largely outside the insurer's control. However, to set premiums at a reasonable level, it is necessary to predict or estimate future claims, e.g., from the insurer's perspective it is beneficial to set premiums high enough to cover claims and overhead but not so high as would drive away potential customers due to uncompetitive pricing. The process of mathematically processing data associated with a risk portfolio to predict or estimate future loss is called "risk modeling." Traditionally, this has involved using actuarial methods where statistics and probability theory are applied to a risk portfolio as a whole (i.e., with the risks grouped together), and taking into consideration data relating to overall past performance of the risk portfolio.

While existing, actuarial-based methods for risk modeling in the insurance industry are generally effective when large amounts of data are available, they have proven less effective in situations with less on-hand data. This is because the data curves generated with such methods, which are used to estimate future losses, are less accurate when less data is present—in estimating a curve to fit discreet data points, the greater the number of data points, the more accurate the curve. Also, since portfolios are considered as a whole, there is no way to effectively assess individual risks using such methods.

Risk assessment surveys are sometimes used as part of the process of risk modeling or management, for purposes of collecting data relating to an insurance portfolio. In a general or non-mathematical sense, risk assessment surveys may be used to identify risk management strengths and weaknesses of individual risks and/or risk portfolios. For example, if a particular risk weakness is identified through a survey, e.g., an outdated fire suppression system in a manufacturing plant, the insured may be encouraged to make appropriate changes to reduce the problem. Alternatively, premiums may be increased to compensate for the increased risk factor. Risk assessment surveys may also be used to harvest data for increasing the overall data available for risk modeling.

Risk assessment surveys are typically developed and carried out by risk management specialists, and may involve a series of specially selected questions both directly and indirectly related to the insurance coverage carried by the insured party. The survey may also involve direct inspections or observations of buildings, operations, etc. Accordingly, the costs associated with risk assessment surveys are typically not insignificant. However, it is difficult to determine (especially beforehand) if the costs associated with risk assessment surveys are "worth it," i.e., if they will provide meaningful information as to significantly impact risk management decisions and/or risk modeling calculations. Heretofore, prior quantitative determinations of the value associated with surveys have not been possible, leaving insurers without an accurate tool to determine when to proceed with surveys for a risk or portfolio.

SUMMARY OF THE INVENTION

An embodiment of the present invention relates to a method for determining the prior net benefit of obtaining data relating to an individual risk in an insurance portfolio, via a survey or similar procedure, for use in a predictive model or otherwise. (By "individual risk," it is meant a single insured property, e.g., a building, item of equipment, vehicle, company, person, or parcel of land, as well as a grouping of such insured properties.) The method produces as an output a quantitative estimation (e.g., dollar value) of the net benefit of obtaining survey data for a risk, calculated as the benefit of the survey less the cost of the survey, where the benefit of the survey relates to a quantitative increase in predictive accuracy resulting from incorporating the survey data into the predictive model. With prior knowledge of a survey's net benefit, either positive or negative, it is possible to make a more informed decision as whether or not to carry out a survey for a particular risk.

The survey benefit method may be implemented in conjunction with a risk/loss model such as a Bayesian predictive model that combines historical data, current data, and expert opinion for estimating frequencies of future loss and loss distributions for individual risks in an insurance portfolio. The purpose of the Bayesian model is to forecast future losses for the individual risk based on the past losses and other historical data for that risk and similar risks. In addition to the Bayesian predictive model, the method utilizes a revenue model, a model for the cost of obtaining additional data (e.g., survey cost), and probability distributions of population characteristics.

Initially, a risk model (e.g., a Bayesian predictive model) is developed at the individual risk level for mathematically estimating the probability of expected loss given a set of information about the risk. The risk model is incorporated into a profitability model for the risk, which also includes premium and expense models for the risk. (Generally speaking, the profitability model is a statistical "expansion" of the following insurance truism: profit=premiums−losses−marginal expenses.) Subsequently, a probability distribution relating to the type or category of information possibly to be obtained by way of a survey is developed or determined, which is used as a basis for determining the gross value of obtaining the information. In particular, the gross value is the projected profitability of the best action or outcome (e.g., of insuring or not insuring the risk) given the additional information obtained from the survey, less the projected profitability of the best action or outcome to be expected without knowing the additional information. From the gross value, the net benefit of conducting the survey is determined, e.g., net benefit=gross value−survey cost. If the net benefit is positive, that is, if the benefit of conducting a survey outweighs the survey's cost, rational insurers will carry out the survey. If not, insurers may opt not to conduct the survey.

BRIEF DESCRIPTION OF THE DRAWINGS

The present invention will be better understood from reading the following description of non-limiting embodiments, with reference to the attached drawings, wherein below:

FIG. 1 is a schematic diagram of a system and method of predictive modeling for estimating frequencies of future loss and loss distributions for individual risks in an insurance portfolio;

FIGS. 2 and 5 are flow charts showing the steps of the method in FIG. 1;

FIGS. 3A-3F and 4A-4C show various equations used in carrying out the method;

DETAILED DESCRIPTION

Figure 6:
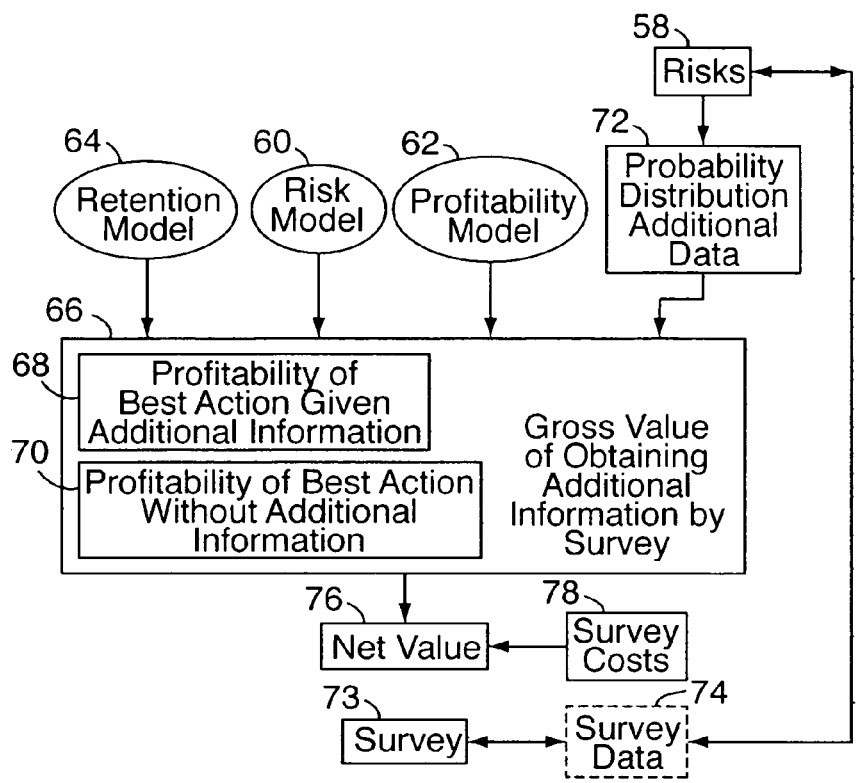
FIG. 6 is a schematic view of a system for determining the prior net benefit of obtaining data relating to an individual risk in an insurance portfolio, via a survey or similar procedure, according to an embodiment of the present invention.

An embodiment of the present invention relates to a method for determining the prior net benefit of obtaining data relating to an individual risk in an insurance portfolio, via a survey or similar procedure, for use in a predictive model or otherwise. (By "individual risk," it is meant a single insured property, e.g., a building, item of equipment, vehicle, company, person, or parcel of land, as well as a grouping of such insured properties.) The method produces as an output a quantitative estimation (e.g., dollar value) of the net benefit of obtaining survey data relating to a risk, calculated as the benefit of the survey less the cost of the survey, where the benefit of the survey relates to a quantitative increase in predictive accuracy resulting from incorporating the survey data into the predictive model. With prior knowledge of a survey's net benefit, either positive or negative, it is possible to make a more informed decision as whether or not to carry out a survey for a particular risk.

The survey benefit method may be implemented in conjunction with a risk model such as a Bayesian predictive model that combines historical data, current data, and expert opinion for estimating frequencies of future loss and loss distributions for individual risks in an insurance portfolio. The purpose of the Bayesian model is to forecast future losses for the individual risk based on the past losses and other historical data for that risk and similar risks. In addition to the Bayesian predictive model, the method utilizes a revenue model, a model for the cost of obtaining additional data (e.g., survey cost), and probability distributions of population characteristics.

Initially, a risk model (e.g., a Bayesian predictive model) is developed at the individual risk level for mathematically estimating the probability of expected loss given a set of information about the risk. The risk model is incorporated into a profitability model for the risk, which also includes premium and expense models for the risk. (Generally speaking, the profitability model is a statistical "expansion" of the following insurance truism: profit=premiums−losses−marginal expenses.) Subsequently, a probability distribution relating to the type or category of information possibly to be obtained by way of a survey is developed or determined, which is used as a basis for determining the gross value of obtaining the information. In particular, the gross value is the projected profitability of the best action or outcome (e.g., of insuring or not insuring the risk) given the additional information obtained from the survey, less the projected profitability of the best action or outcome to be expected without knowing the additional information. From the gross value, the net benefit of conducting the survey is determined, e.g., net benefit=gross value−survey cost. If the net benefit is positive, that is, if the benefit of conducting a survey outweighs the survey's cost, rational insurers will carry out the survey. If not, insurers may opt not to conduct the survey.

The process for developing a Bayesian predictive model is described below with reference to FIGS. 1-5. The method for determining the prior net benefit of obtaining data relating to an individual risk in an insurance portfolio via a survey or similar procedure is described further below with respect to FIGS. 6 and 7.

FIGS. 1-5 illustrate a method or system 10 of predictive modeling for generating a forecast of expected loss 12 for individual risks 14a, 14b, 14c, 14d, etc. in an insurance portfolio 16. Typically, this will be done for insurance-related purposes, for determining premium levels and the like. By "individual risk," it is meant a single insured property, e.g., a building, item of equipment, vehicle, company/business, person, operation/manufacturing line, or parcel of land. For generating the loss forecast 12, the method uses a Bayesian procedure 18 that incorporates historical data 20 relating to the individual risk 14b in question. The historical data 20 will typically comprise information somehow relevant or related to the risk, and may include any of the following: recorded losses for the risk, with date, amount and type of loss, for a given loss basis (such as paid or incurred); the period during which the risk was exposed to recorded losses, namely, the effective and expiration dates of any policies applying to the risk; the terms and conditions of the policies applying to the risk, principally deductible, limit, and coinsurance; and various characteristics of the risk. For example, for a building such characteristics could include value, occupancy, construction type, and address/location.

The Bayesian procedure 18 also utilizes historical data 20 relating to similar risks 22. By "similar risk," it is meant a risk other than the individual risk 14b that has some logical connection or relationship thereto, such as features or characteristics in common, at least in a general sense. For example, if the individual risk 14b is a hospital, then similar risks could include other hospitals, other medical facilities, or even other buildings within a relevant (i.e., the same or similar) geographical area. The similar risks may be risks within the portfolio 16, but do not have to be. As should be appreciated, the historical data from the similar risks provides a significantly larger data pool than just the historical data for the individual risk 14b by itself. It is relevant to the loss forecast for the individual risk 14b because data from a similar risk will typically tend to have some bearing on the individual risk, i.e., from a statistical or probabilistic standpoint, similar risks will likely experience similar losses over time. For example, if all the hospitals over a certain size in a particular area experience at least a certain amount of loss in a given period, such information will tend to increase the probability that a similar hospital in the same area will also experience at least the same loss.

Expert opinion 24 relating to the individual risk 14b is also obtained and utilized as part of the Bayesian procedure 18 calculations. The expert opinion 24 acts as a baseline for calculating the loss forecast 12 when little or no historical data 20 is available. Thus, where historical data is unavailable, the expert opinion 24 dominates the predictive calculation. The expert opinion 24 is typically provided as (or expressed as part of) a mathematical function or model that defines an estimated probability distribution of some aspect of the individual risk 14b or a related or similar risk 24. As its name implies, the expert opinion 24 may be obtained from professionals in the field who have studied some aspect of the individual or similar risks in question. Expert opinion may also be obtained from reference works. For a particular portfolio, the expert opinion may collectively include input from a number of professional sources, each of which relates to one or more aspects of the individual or similar risks. In other words, when implementing the method 10, it may be the case that a number of different functions/models are obtained and utilized as expert opinion, to more fully characterize the individual or similar risks in the Bayesian procedure 18.

As an example, in a simple case where all the risks in a portfolio are generally the same except for value, the frequency of loss for such risks might be characterized as the following probability distribution:

frequency of loss=$c \cdot (v/v_0)^b$, where

"c" and "b" are system parameters
v=value
$v_0$=reference size/value

Here, the equation itself might be considered expert opinion, i.e., obtained from a professional/expert or reference work, as might the range of values for the system parameters "c" and "b". For example, given the equation and system parameters, an expert might be consulted to provide values for "c" and "b" that give the highest probability to fit the data. Thus, expert opinion might be solicited for selecting the best model based on the type of data to be modeled, as well as the best system parameters given a particular model.

For the Bayesian procedure 18, current data 26 may also be obtained and utilized. "Current" data 26 is the same as historical data but is instead newly obtained as the method 10 is carried out over time. For example, if an individual risk 14b experiences a loss after the method/system 10 has been implemented initially, then information about this loss may be entered into the system 10 as current data 26.

FIG. 2 summarizes the steps for carrying out the method 10 for forecasting the future losses 16 for an individual risk 14b. As discussed further below, these steps may be performed in a different order than as shown in FIG. 2, e.g., it will typically be the case that expert opinion is obtained after first establishing a predictive model. At Step 100, the expert opinion 24 relating to the individual risk 14b and/or similar risks 22 is obtained. Then, at Step 102, the historical data 20, again relating to the individual risk and/or similar risks 22 is obtained. If historical data 20 is not available, then this step will be bypassed until historical and/or current data become available. In such a case, the Bayesian procedure 18 is carried out with the expert opinion 24 only, which, as noted above, acts as an estimation or baseline.

At Step 104 in FIG. 2, the historical data 20, any current data 26, and expert opinion 24 are combined using the Bayesian procedure 18. The effect of the Bayesian procedure 18 is to forecast the future losses 12 for the individual risk 14b based on the past losses and other historical data 20 for that risk 14b and similar risks 22. Typically, the Bayesian procedure 18 will utilize a Bayesian predictive model as shown by equation 28 in FIG. 3A. In equation 28, a predictive conditional probability distribution "f (y|x)" of forecast losses ("y") for the individual risk 14b, given all historical data ("x"), is represented in terms of: (i) a probability distribution "f(y|θ)" of the forecast losses y given a system parameter set ("θ"), i.e., a forecast losses likelihood function; (ii) a probability distribution "f(x|θ)" for the historical data, i.e., an historical data likelihood function; and (iii) a prior probability density function of the parameter set "f(θ)."

Equation 28 in FIG. 3A is generally applicable in carrying out the method 10. This equation is derived with reference to Steps 106-112 in FIG. 2, provided for informational purposes. To derive equation 28, at Step 106, the conditional probability distribution f(y|x) of forecast losses y for the individual risk 14b, given all historical data x, is represented as a weighted sum of , probability distributions, as shown by equation 30 in FIG. 3B. The weighted sum may be an integral of the probability distribution f(y|θ) of the forecast losses y given the system parameter set θ times a parameter set weight "f(θ|x)." Here, the parameter set weight f(θ|x) is a posterior probability density function of the system parameters θ given the historical data x. Equation 30 is a standard equation for the predictive distribution of a random variable of interest y given observed data x.

At Step 108, the probability distributions f(y|θ) for forecast losses y are arranged to depend on the parameter set θ, indexed by an index "i". At Step 110, the probability distributions f (x|θ) for historical data are also arranged to depend on the same parameter set θ, also indexed by the index "i". Next, at Step 112, the posterior probability density function f (θ|x) is calculated as the probability distribution of the historical data given the parameter set f (x|θ), times the prior probability of the parameter set f(θ), obtained from the expert opinion 24. This is shown as equations 32 in FIG. 3C (these equations are standard representations of Bayes' theorem for probability densities). Thus, combining equations 30 and 32, the conditional probability distribution f (y|x) of forecast losses y for the individual risk 14b, given all historical data x, is as shown by equation 28 in FIG. 3A. This can be further represented by:

$$f(y|x) = f(y|\theta_1) \cdot p(\theta_1) + f(y|\theta_2) \cdot p(\theta_2) + \ldots$$

where each "p" is the probability of the particular respective system parameter θ.

Starting with the predictive model 28 (FIG. 3A), the probability distributions f (y|θ) and f (x|θ) are obtained for the forecast losses y and historical data x, respectively, using a compound Poisson process model. Generally speaking, a Poisson process is a stochastic process where a random number of events (e.g., losses) is assigned to each bounded interval of time in such a way that: (i) the number of events in one interval of time and the number of events in another disjoint (non-overlapping) interval of time are independent random variables, and (ii) the number of events in each interval of time is a random variable with a Poisson distribution. A compound Poisson process is a continuous-time stochastic process "Y(t)" represented by equation 34 in FIG. 3D, where Y(t) represents the aggregate loss, "N(t)" is a Poisson process (here, the underlying rate of losses), and "$X_i$" are independent and identically distributed random variables which are also independent of "N(t)" (here, $X_i$ represents the severity distribution of the losses). If full knowledge of the characteristics of a risk 14b were available, historical and forecast losses for that risk could be approximated by a compound Poisson process, in which losses for each type of loss occur according to a Poisson process, and where the size of "ground-up" loss is sampled from a severity distribution depending on the type of loss (ground-up loss refers to the gross amount of loss occurring to a reinsured party, beginning with the first dollar of loss and after the application of deductions). Here, in order to accommodate heterogeneity in a class of similar risks because full knowledge of a risk's characteristics may not be available, losses for each risk are modeled as a finite mixture of compound Poisson processes, as at Step 114 in FIG. 2. As noted, the parameters of the compound Poisson process will typically be the underlying rate of losses (N(t)) and the severity distribution ($X_i$) of the ground-up losses, which depend on the known characteristics 20 of the risk 14*b*. In the case of a building, such characteristics will typically include value, occupancy, construction type, and address, and they may also include any historical claims/losses for that risk.

At Step 116, the probability distribution f (y|x) is calculated or approximated to produce the probability distribution of losses 12 for the forecast period for the individual risk 14*b*. With respect to equation 28 in FIG. 3A, the expert opinion from Step 100 is incorporated into the equation as the prior probability density function f ($\theta$). Then, at Step 118, forecasts of paid claims for the individual risk 14*b* may be obtained by applying limits and deductibles to the forecast of losses 12 for that risk 14*b*. Generally, gross loss "Z" (see equation 36 in FIG. 3E) can be represented as the sum of losses "$x_i$" from i=1 to N, where "N" is a frequency of loss, but where each loss x is reduced by any applicable deductibles. Thus, the final outcome of the system 10 is represented as shown in equations 38 and 40 in FIG. 3F. At Step 120, current data 26 may be incorporated into the method/system 10 on an ongoing manner.

For each individual risk 14*a*-14*d*, the method 10 may also be used to produce breakdowns of forecasted expected loss by type of loss, a forecasted probability distribution of losses, a calculation of the effect of changing limits, deductibles, and coinsurance on the loss forecast, and a forecasted expected loss ratio, given an input premium. The method 10 may also be used to produce joint probability distributions of losses for a forecast period for risks considered jointly, as indicated by 42 in FIG. 1.

The above-described Bayesian procedure for estimating the parameters of a compound Poisson process for the purpose of predictive risk modeling will now be described in greater detail.

For a portfolio 16, the ultimate aim of the predictive model should be to produce a probability distribution for the timing and amounts of future claims, by type of claim, given the information available at the time of the analysis, i.e., the historical data 20. This information 20 will generally include: (i) past claims; (ii) past coverages, including effective dates, expiration dates, limits, deductibles, and other terms and conditions; (iii) measurements on past risk characteristics such as (in the case of property coverage) construction, occupancy, protection, and exposure characteristics, values, other survey results, and geographic characteristics; (iv) measurements on past environmental variables, such as weather or economic events; (v) future coverages (on a "what-if" basis); (vi) measurements on current risk characteristics; and (vii) measurements on current and future environmental variables. Future environmental variables can be treated on a what-if basis or by placing a probability distribution on their possible values. For simplicity, it may be assumed (as herein) that current and future environmental variables are treated on a what-if basis.

In the formulas discussed below, the following abbreviations are used:

cl1=future claims occurring in the period $t_0$ to $t_1$
cv1=actual or contemplated future coverages for the period $t_0$ to $t_1$
rm1=measurements on risk characteristics applicable to the period $t_0$ to $t_1$
ev1=assumed environmental conditions for the period $t_0$ to $t_1$
cl0=future claims occurring in the period $t_1$ to $t_0$ (or more generally, for a specified past period)
cv0=actual past coverages for the period $t_1$ to $t_0$
rm0=measurements on risk characteristics applicable to the period $t_1$ to $t_0$
ev0=environmental conditions for the period $t_1$ to $t_0$ The probability distribution for the timing and amounts of future claims, by type of claim, given the information available at the time of the analysis, can be written as:

$$p\ (cl1|cv1,\ rm1,\ ev1,\ cl0,\ cv0,\ rm0,\ ev0)$$

where "p" denotes a conditional probability function or probability density where the variables following the bar are the variables upon which the probability is conditioned, i.e., a probability density of cl1 given variables cv1, rm1, ev1, cl0, cv0, rm0, and ev0. (It should be noted that this is a more detailed rendering of the more generalized conditional probability distribution "f (y|x)" noted above.) Construction of the predictive model begins by introducing the set of parameters, collectively denoted by $\theta$, which denote the risk propensities of the risks 14*a*-14*d* in the portfolio 16. A standard probability calculation results in equation 50 as shown in FIG. 4A. (Again, it may be noted that equation 50 is a more detailed equivalent of equation 28 in FIG. 3A.) Equation 50 is true regardless of the assumptions of the model.

The model assumptions now introduced are as follows. Firstly, $$p\ (cl1|cv1,\ rm1,\ ev1,\ cl0,\ rm0,\ ev0,\ \theta) = p\ (cl1|cv1,\ rm1,\ ev1,\ \theta)$$

which expresses the assumption that if the loss/risk propensities $\theta$ are known, the future claims for the portfolio depend only on the current and future coverages, risk measurements, and environmental variables, and not on the past claims and other aspects of the past. The validity of this assumption depends on the ability to construct a model that effectively captures the information from the past in terms of knowledge about risk propensities. Secondly, $$p\ (cl0|cv1,\ rm1,\ ev1,\ cv0,\ rm0,\ ev0,\ \theta) = p\ (cl0|cv0,\ rm0,\ ev0,\ \theta)$$

which expresses the assumption that, provided past coverages, risk measurements, and environmental variables are known, knowing future values for these quantities is irrelevant when considering the likelihood of past claims data. This assumption does not exclude the case in which present risk measurements can shed light on past risk characteristics, for example when a survey done more recently sheds light on risk characteristics further in the past. Thirdly, $$p\ (\theta|cv1,\ rm1,\ ev1,\ cv0,\ rm0,\ ev0) = p\ (\theta)$$

which expresses the assumption that the prior probability distribution for the risk propensities p($\theta$) does not depend on additional information. The risk propensities can be expressed in such a way that this assumption is valid, for example by assigning prior probability distributions of risk propensity to classes and types of risks, rather than to individual risks.

Given these three assumptions, the predictive model can be written as equation 52 in FIG. 4B.

The Bayesian model estimation process includes the following steps, as shown in FIG. 5. Starting with the model from equation 52 in Step 130, the future claims (losses) likelihood function p(cl1|cv1, rm1, ev1, θ) is constructed at Step 132. At Step 134, the past claims (historical data) likelihood function p(cl0|cv0, rm0, ev0, θ) is constructed. At Step 136, expert opinion is obtained for the prior distribution for risk propensities p(θ). Next, at Step 138, the Bayesian predictive model is solved or approximated. Step 140 involves model criticism and checking.

The past and future claims likelihood functions may be constructed as follows (in the basic case). Conditional on a fixed and known value for θ, claims are considered to be generated by a multivariate compound Poisson process, in which ground-up losses occur according to a Poisson process with rate $\lambda$ (i, j) for risk "i" and type of loss "j" (as noted above, the risk 14a-14d could be a building, an establishment, or any other specific entity within the portfolio 16). The ground-up loss amounts are considered to be generated independently from a loss distribution F (i, j) again depending on risk i and type of loss j. Both $\lambda$ (i, j) and F (i, j) depend on risk measurements for risk i and environmental variables, in such a way that $\lambda_{Past}$ (i, j)=$g_j$ (past risk measurements for i, past environmental variables, θ)

$\lambda_{Future}$ (i, j)=$g_j$ (current risk measurements for i, current environmental variables, θ)

$F_{Past}$ (i, j)=$h_j$ (past risk measurements for i, past environmental variables, θ)

$F_{Future}$(i,j)=$h_j$ (current risk measurements for i, current environmental variables, θ)

The functions $g_j$ and $h_j$ are known functions that are designed to produce a flexible set of representations for the way in which the loss process for a risk depends on the characteristics of a risk and environmental variables. A hypothetical example could be $g_j$ (past risk measurements for i, past environmental variables, θ)=exp($a_0+a_1 \ln(x_1)+a_2 x_2+\ldots$) for occupancy=A, region=X, ... =exp($b_0+b_1 \ln(x_1)+b_2 x_2+\ldots$) for occupancy=B, region=X, ...

...

where $x_1$=square footage, $x_2$=mean winter temperature for location, ...

In this case $a_0, a_1, a_2, b_0, b_1, b_2, \ldots$ are all elements of the collection of parameters that is denoted by θ.

The basic model makes the assumption that the past risk propensities equal the future risk propensities, and the functions linking the risk propensities to the loss process are the same in past as in the future, so that all the differences in frequency and severity between past and future are explained by changes in risk measurements and environmental variables. Extensions to the model allow for risk propensities and risk characteristics to evolve according to a hidden-Markov model. Another extension is to allow time-dependent rates for the Poisson processes generating the ground-up losses. This may be necessary if forecasts of total claims for partial-year periods are required in order to deal with seasonality issues. Allowing for seasonally changing rates also allows for slightly more precision in estimating the claims process. It should be noted that the existing model allows for the predicted claims for a risk (i) to be influenced by the number and amount of past claims for that same risk if coverage existed on that risk in the past.

In practice, loss distributions are parameterized by a small number of parameters—for example, F may be lognormal with parameters μ and σ, in which case $\mu_{Past}$(i, j)=$h\mu_j$(past risk measurements for i, past environmental variables, θ)

$\mu_{Future}$(i, j)=$h\mu_j$(current risk measurements for i, current environmental variables, θ)

$\sigma_{Past}$(i, j)=$h\sigma_j$(past risk measurements for i, past environmental variables, θ)

σFuture(i, j)=$h\mu_j$(current risk measurements for i, current environmental variables, θ)

The model uses finite mixtures of lognormal distributions in order to approximate a wider range of loss distributions than a single lognormal distribution can. In this case there are several values for μ and σ, one for each component, as well as a set of mixing parameters. The extension to the model is that now there are more functions, but each is still a known function with unknown parameters that are part of the collection of parameters θ.

The method described does not specify the functions linking the risk measurements and environmental variables to the parameters of the compound process. Functions that have been shown to work well in practice include linear, log-linear and power functions, and nonlinear functions that are piecewise continuous such as piecewise linear functions and natural splines. Useful are functions of linear or nonlinear combinations of several variables, such as the ratio of value to square footage, or contents value to building value in the case of property risks.

To model the claims process, given a model for the ground-up loss process, it is necessary to apply terms of coverage, limits and deductibles to the modeled ground-up loss process. If no coverage is in effect over an interval of time for a given risk, all losses generated by the ground-up loss process during that interval of time are not observed. Any losses below the deductible are not observed and any losses above the limit are capped at the limit. Because of the characteristics of the compound Poisson process, the claims process is also a compound Poisson process (during periods of coverage), with the rate of claims for risk i and loss type j being $\lambda$(i, j)*Pr($X_{i,j}$>$deductible_i$) where $X_{i,j}$ has the distribution given by $F_{i,j}$ and the size of the claims for risk i and loss type j having the same probability distribution of that of min($X_{i,j}$−$deductible_i$, $polmit_i$) conditional on this quantity being positive.

Once the past claims process and the future claims process have both been specified in terms of two (related) compound Poisson processes, it is straightforward to write the likelihood functions for past claims and future claims using standard formulas. The function can be expressed in simple mathematical terms although the formula is lengthy when written. A single compound Poisson process has a likelihood function as shown by equation 54 in FIG. 4C, where "N" is the number of claims (above deductible), "$x_i$" are the sizes of the claims (after deductible), "$\lambda$" is the annual rate of the Poisson process, "z" is the number of years exposed to losses, and "f" is the probability density of the claim distribution (there is a simple modification for distributions with masses at a single point which occur when there is a limit).

Once θ is known, $\lambda$ and f can be calculated for each combination of risk and loss type for past claims. It is assumed that losses occur independently at each risk, conditional on θ, so the past likelihood for the whole portfolio is just the product of factors, one factor for each combination of risk (i) and loss type (j), where each factor has the form given above, except that z, $\lambda$, and f depend on (i, j) and N is replaced by N(i, j) which is the number of past claims for risk (i) and loss type (j).

The same process produces the likelihood for future claims (z, λ, and f may be different in the future likelihood function than in the past likelihood function even for the same risk and loss type).

The remaining portion of the general formula involves the prior probability distribution $p(\theta)$. This is obtained through expert elicitation, as at Step 100. Where there is sufficient loss data, the effect of the prior probability distribution tends to be small. However, in the collection of parameters given by $\theta$ there may be some parameters (such as the frequency for a particular class of business with a small exposure) for which there is little claim data, in which case these parameters will be more sensitive to the expert opinion incorporated in the prior.

Once the past and future likelihood functions and the prior distribution have been specified, the probability distribution of predicted claims can be obtained by solving the predictive model integral given above. This produces a probability distribution for the predicted claims for each risk and each type of loss in the future portfolio, given coverage assumptions. Solving this sort of integral is a central topic of Bayesian computation and is the subject of extensive literature. In general, numerical techniques are required, a popular simulation method being Markov Chain Monte Carlo. An alternative procedure is to obtain the maximum likelihood estimate of $\theta$, which is the value of $\theta$ that maximizes the past likelihood function. Since all the quantities besides $\theta$ in the past likelihood function are known (these are past claims, past coverages, past risk measurements, and past environmental variables), this function, namely $$p(c10|cv0, rm0, ev0, \theta)$$

can be maximized as a function of $\theta$. It is known that under most conditions and given enough data, the likelihood, as a function of $\theta$, can be approximated by a multidimensional quadratic surface. Experience using the procedure with real data reinforces this theoretical finding. If this is the case, then the probability distribution of $\theta$, given the past data, can be approximated as a multivariate Normal distribution. A further approximation uses the mean of this multivariate Normal distribution as the single point estimate of $\theta$ (the Bayes posterior mean estimate).

Given a single point estimate of $\theta$, the predictive distribution of future claims is straightforward to calculate, since it is the given by the future likelihood. The predicted future ground-up losses are given by a compound Poisson process whose parameters are given in the simplest case by $\lambda_{Future}(i, j) = g_j$(current risk measurements for i, current environmental variables, $\theta$)

$\mu_{Future}(i, j) = h\mu_j$(current risk measurements for i, current environmental variables, $\theta$)

$\sigma_{Future}(i, j) = h\sigma_j$(current risk measurements for i, current environmental variables, $\theta$)

where $\theta$ is set to the Bayes posterior mean estimate, and the claims compound Poisson process is obtained by applying deductible and limit adjustments as described previously.

If the predicted annual average loss (after deductible and limit) is desired for risk (i) and loss type (j), and if the posterior mean estimate is being used, then the average annual loss is given by $$\lambda(i,j) * Pr(X_{i,j} > d_i) * E(\min(X_{i,j} - d_i, l_i) | X_{i,j} > d_i)$$

where "d" and "l" refer to deductible and limit respectively. If the severity distributions are given by mixtures of lognormals, then this formula can be easily calculated. If a single point estimate of $\theta$ is not desirable, then the posterior distribution of $\theta$ can be approximated by a finite distribution putting probability on a finite set of points. In this case the average annual loss is given by a weighted sum of terms like that above. In either case, the predictive modeling procedure produces a calculation for that can be done quickly by a computer, and does not require simulation. Calculation of average annual losses by layer is also straightforward.

The method/system 10 may be implemented using a computer or other automated data processing or calculation device.

Figure 7:
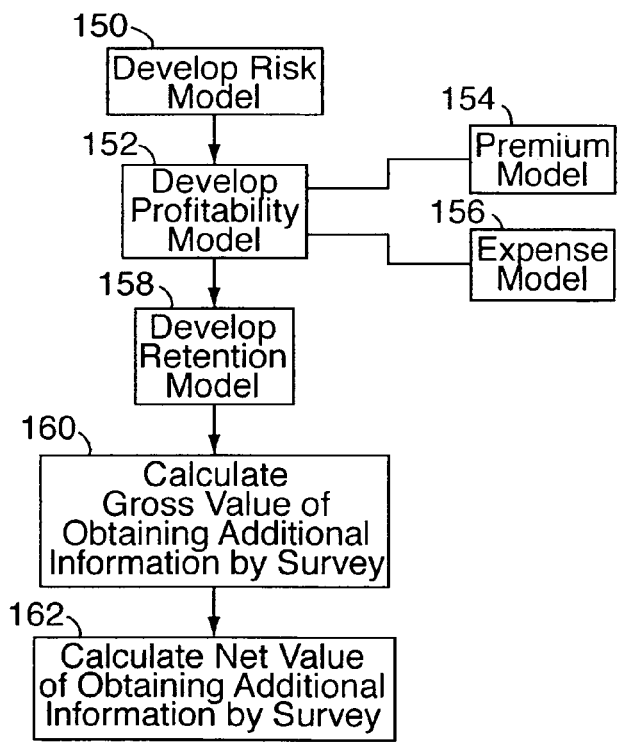
FIG. 7 is a flow chart showing the steps of a method carried out by the system in FIG. 6.

FIGS. 6 and 7 show in more detail the method/system for determining the prior net benefit of obtaining survey data relating to an individual risk or category of risks 58 in an insurance portfolio.

Initially, at Step 150 a risk model 60 is developed at the individual risk level, if needed. If one or more models have already been developed, then an existing model may be used. The risk model may be a Bayesian predictive model developed according to the above. Generally speaking, the risk model is a mathematical model of the expected loss for a risk having certain characteristics:

E (loss|basic risk info, additional risk info, offer terms, contract accepted, loss prevention plan)

In other words, the risk model looks at the probability or expectation of loss given a set of information including (in this example) basic risk information (e.g., location), additional risk information (e.g., building characteristics), offer terms (e.g., policy terms, insurance limits, deductible), whether the insurance contract has been accepted, and whether a loss prevention plan is in place and/or the characteristics of such a loss prevention plan.

The risk model 60 is incorporated into a profitability model 62, as at Step 152. This may involve developing a premium model, as at Step 154, and an expense model, as at Step 156. Generally, the profitability model for a risk may be expressed as the following:

$$E(U|\text{offer terms\_a, acceptance}) = E \text{ (premium)} - E \text{ (loss)} - E \text{ (marginal expense)}$$

Here, "U" is the profitability, "E (premium)" is the premium model (e.g., expected premium as defined by the insurance contract), "E (loss)" is the risk model, and "E (marginal expense)" is the expense model, e.g., the expected value of marginal expenses of the insurance carrier as relating to this insurance contract, as possibly determined from expert opinion. Overall, the profitability model sets forth the expected profit "U" given certain terms "a" and acceptance by the insured. In other words, given that an insured party has accepted the offer for an insurance contract having certain terms "a," the profitability model sets forth the expected profit.

At Step 158, a retention model 64 is developed, that is, a model of the probability of a potential insured party accepting a particular offer. The retention model 64 is incorporated into the calculation for determining the gross value associated with obtaining additional information by survey. The retention model (probability of acceptance) is given as:

$$E(U|a) = E(U|\text{offer terms\_a, acceptance}) \cdot Pr(\text{acceptance}|\text{offer terms\_a}) + E(U|\text{offer terms\_a, decline}) \cdot Pr(\text{decline}|\text{offer terms\_a})$$

Here, "E (U|a)" is the expectation of profitability U given an action "a," e.g., offering an insurance contract. "Pr" is the probability, e.g., the probability of a potential insured party accepting the offer given certain offer terms "a." As should be appreciated, the second half of the equation (relating to a party declining the offer) reduces to a 0 (zero) value, because there is no expected profitability in the case where a party declines the offer for insurance.

At Step 160, the gross value 66 of the additional information to be obtained by way of a survey is determined. Generally speaking, the gross value of the information is calculated as the profitability 68 of the best action given additional information "X" less the profitability 70 of the best action without knowing X. In other words, if more profit is expected from knowing information X than from not knowing information X, then obtaining the information X has a positive gross value. This can be expressed more precisely as follows:

$$[\text{Gross value}] = E_x[\max\_a \cdot E(U|X, a)] - \max\_a \cdot E_x(E(U|X, a))$$

where:

X=additional information $E_x$=expectation function max_a·E (U|X, a)=profitability of best action given additional information X max_a·$E_X$(E (U|X, a))=max_a·E (U|a)=profitability of best action w/o X max_a=payoff for best possible action As part of this determination, it will typically also be necessary to obtain the probability distribution 72 of the additional information X, that is, the marginal distribution of the additional information. The probability distribution may be obtained from expert opinion and/or historical data.

As a simple example of the above, suppose that an insurance carrier insures warehouses 58 within a certain geographical area, e.g., the manufacturing district of a city. Additionally, suppose that all the warehouses either have a flat roof or a sloped or pitched roof. Further suppose that past insurance contracts have resulted in an average of $40 profit (per time period) for warehouses with pitched roofs, and an average loss of −$100 for warehouses with flat roofs. The relevant issue is whether it is "worth it" to determine beforehand, via a survey procedure 73, if a prospective warehouse has a sloped roof or a flat roof 74, prior to the insurance carrier agreeing to insure the warehouse.

From expert opinion and/or historical data, the probability of the additional information is determined or estimated in advance. Here, for example, suppose 20% of all warehouses have flat roofs, and 80% have pitched roofs. Without a survey 73, and thereby without knowing whether a particular warehouse has a flat or pitched roof 74, the insurance carrier will insure all proffered warehouses, e.g., the insurer has no reason for declining any particular warehouse. (Additionally suppose that the warehouses accept the offered insurance under a standard contract.) In this case, the expected profitability of the best action (e.g., insuring all warehouses) without knowing the additional information is given as the following:

$$(20\%)(-\$100)+(80\%)(+\$40)=+\$12$$

In other words, out of 100 warehouses seeking insurance, 100 are offered and accept insurance. Out of these, 20 will have flat roofs with a total expected loss of −$2000, and 80 will have pitched roofs with a total expected profit of +$3200. This results in a net profit of +$1200, or $12/warehouse.

If a survey 73 is conducted, the insurer will know in advance that a particular warehouse has a flat or pitched roof 74. In such a case, knowing that a flat roof results in an average loss, a rational insurer will decline all flat-roofed warehouses. Thus, the profitability of the best action (e.g., insuring only pitched-roof warehouses) given the additional information as to roof type is as follows:

$$(20\%)(\$0 \rightarrow \text{insurance is declined, therefore no profit or loss})+(80\%)(+\$40)=\$32$$

In other words, out of 100 warehouses seeking insurance, the 20 having flat roofs are denied insurance, while the 80 having sloped roofs are granted insurance, resulting in $3200 profit, or $32/warehouse among all 100 warehouses.

The gross value of the additional data=$32−$12=$20/warehouse. In other words, the profit for insuring 100 randomly selected warehouses would be $1200, while the profit for only insuring the 80 of those warehouses having pitched roofs (as determined from a survey) would be $3200. The gross benefit of conducting the survey is $2000, or $20/warehouse.

From the gross value of the additional information, the net value 76 is obtained, as at Step 162. The net value 76 is calculated as the gross value 66 less the expenses 78 associated with obtaining the additional information, e.g., the cost of the survey:

$$\text{net value} = \text{gross value} - \text{cost/survey}$$

The cost per survey can be a standard value, or a value otherwise obtained by consulting with experts or survey firms or professionals. For example, there might be a general cost associated with developing/writing the survey, and a cost associated with carrying out the survey for each property/risk, e.g., labor costs for a worker to carry out the survey at each property/risk.

The net value will inform the decision of whether to carry out a survey 73. If the net value is negative, then it is more likely that a survey will not be carried out. If the net value is positive, that is, if the gross value exceeds the associated survey costs, then it is more likely that a survey will be carried out to obtain survey data 74 before contracting to insure a particular risk.

The types of information to consider for possibly obtaining by survey will depend on the nature of the risk. Examples include credit characteristics, prior loss history, location characteristics, construction characteristics, and the age and condition of building fixtures. Additionally, it will typically be the case that the survey information is correlated to some other characteristic or set of characteristics of the property, e.g., location, occupancy, age, and size, which act as the basic drivers for especially the risk model.

The following sections provide another simplified example illustrating the elements of a value of information calculation for a hypothetical insurance survey. In this example, there is a class of prospective insurance risks (such as commercial establishments) with some known characteristics, as determined by information on an insurance application, for example. However, additional information may be obtained about these risks using certain measurements that incur costs, for example, the information may be obtained via a phone survey or via a more costly on-site survey. Suppose that the phone survey can accurately classify the age of a building or equipment system into classes: (A) 0-10 years, (B) 10-25 years, and (C) 25 years or older. Further suppose that the on-site survey can in addition accurately classify the condition of the system into the classes: (a) good for its age class, (b) average for its age class, and (c) poor for its age class. The following calculations give the value of information for a per phone survey and per site survey. The value of information is in dollars, for this example, and the net benefit of the information would be obtained by subtracting the cost of obtaining the information from the value of the information. The possible actions of the insurer could include: (1) perform no survey, or (2) perform a phone survey, or (3) perform a site survey, followed in all cases by either offering a policy having a lower premium (rate 1), offering a policy having a higher premium (rate 2), or declining to offer coverage. Additional strategies might be available to the insurer, such as performing a phone survey and then performing a site survey in some cases, depending on the results of the phone survey. These will not be considered in this example, although the value-of-information calculations are similar.

The following elements are used for the calculation, which may have been obtained through a combination of historical or sample data analysis, model-fitting, expert opinion, or the like.

Table 1 below shows the population breakdown by age and condition, knowing only that the prospect belongs to the given class of risks:

TABLE 1

|     |       | Condition |     |     |       |
| --- | ----- | --- | --- | --- | ----- |
|     |       | a   | b   | c   | Total |
| Age | A     | 6%  | 21% | 3%  | 30%   |
|     | B     | 8%  | 28% | 4%  | 40%   |
|     | C     | 6%  | 21% | 3%  | 30%   |
|     | Total | 20% | 70% | 10% | 100%  |

Tables 2a and 2b below show the expected marginal net revenue per policy, conditional on the policy being written at either rate 1 or rate 2:

TABLE 2a

Offered and accepted rate 1

|     | Condition |      |        |
| --- | ---- | ---- | ------ |
| Age | a    | b    | c      |
| A   | 4000 | 3000 | 1000   |
| B   | 3000 | 1000 | -5000  |
| C   | 1000 | -1000 | -10000 |

TABLE 2b

Offered and accepted rate 2

|     | Condition |      |       |
| --- | ---- | ---- | ----- |
| Age | a    | b    | c     |
| A   | 6000 | 5000 | 3000  |
| B   | 5000 | 3000 | -3000 |
| C   | 3000 | 1000 | -8000 |

These values would typically be obtained from a risk model combined with premium and cost data. Assume that the marginal net revenue is zero if the policy is not written.

Tables 3a and 3b show the rate of acceptance by the prospect of the insurer's offer, conditional on the policy being offered at either rate 1 or rate 2:

TABLE 3a

Probability of Insured Acceptance, conditional on insurer offer, Rate 1

|     | Condition |     |     |
| --- | --- | --- | --- |
| Age | a   | b   | c   |
| A   | 0.6 | 0.6 | 0.7 |
| B   | 0.6 | 0.7 | 0.7 |
| C   | 0.7 | 0.7 | 0.8 |

TABLE 3b

Probability of Insured Acceptance, conditional on insurer offer, Rate 2

|     | Condition |     |     |
| --- | --- | --- | --- |
| Age | a   | b   | c   |
| A   | 0.2 | 0.2 | 0.5 |
| B   | 0.2 | 0.5 | 0.6 |
| C   | 0.4 | 0.6 | 0.6 |

In the context of policy renewals, this would be termed a retention model. In either new business or renewal contexts, this model might be obtained through a combination of price elasticity studies or expert opinion.

Given these three elements, the following can be calculated.

Tables 4a and 4b below show the expected marginal net revenue per policy, conditional on the policy being offered at either rate 1 or rate 2. In the simplest case, this is obtained by multiplying Tables 2a/2b and Tables 3a/3b. The calculation may be more complex if adverse selection or moral hazard is modeled, as in the case of an insurance prospect that accepts a high premium offer because it is aware of hazards unknown to the insurer.

TABLE 4a

Rate 1

|     | Condition |      |       |
| --- | ---- | ---- | ----- |
| Age | a    | b    | c     |
| A   | 2400 | 1800 | 700   |
| B   | 1800 | 700  | -3500 |
| C   | 700  | -700 | -8000 |

TABLE 4b

Rate 2

|     | Condition |      |       |
| --- | ---- | ---- | ----- |
| Age | a    | b    | c     |
| A   | 1200 | 1000 | 1500  |
| B   | 1000 | 1500 | -1800 |
| C   | 1200 | 600  | -4800 |

From this, one can obtain the optimal insurer action for each combination of age and condition, as shown in Table 5a:

TABLE 5a

Optimal insurer offer

|     | Condition |        |         |
| --- | ------ | ------ | ------- |
| Age | a      | b      | c       |
| A   | rate 1 | rate 1 | rate 2  |
| B   | rate 1 | rate 2 | decline |
| C   | rate 2 | rate 2 | decline |

The expected marginal net revenue can be obtained for each combination of age and condition, as shown in Table 5b:

TABLE 5b

Expected net revenue given insurer optimal strategy

| | Condition | | |
|---|---|---|---|
| Age | a | b | c |
| A | 2400 | 1800 | 1500 |
| B | 1800 | 1500 | 0 |
| C | 1200 | 600 | 0 |

For example, the optimal insurer offer for (A)(a) is to offer rate 1, whose expected payoff is $2400. The weighted average of the optimal strategy payoffs, weighted by the prevalence of each class, gives the overall expected net revenue for a portfolio of risks, randomly distributed according to Table 1. This quantity is $1329 and is the expected payoff per prospect under the site survey strategy.

In comparison, for the no-survey strategy, the same action must be applied to all the cells in the above tables, since there is no information available to classify the risks as above. In this case, the optimal strategy becomes:

TABLE 6a

Optimal insurer offer

| | Condition | | |
|---|---|---|---|
| Age | a | b | c |
| A | rate 2 | rate 2 | rate 2 |
| B | rate 2 | rate 2 | rate 2 |
| C | rate 2 | rate 2 | rate 2 |

TABLE 6b

Expected net revenue given insurer optimal strategy

| | Condition | | |
|---|---|---|---|
| Age | a | b | c |
| A | 1200 | 1000 | 1500 |
| B | 1000 | 1500 | −1800 |
| C | 1200 | 600 | −4800 |

The expected payoff under this strategy is the weighted average of Table 6a, weighted by Table 1. This quantity is $809, and is the expected payoff per prospect under the no-survey strategy. To check that this is the optimum, replace the rate 2 tables with the rate 1 tables and perform the same calculation.

The difference between the two expected payoffs is the value of information, which in this case is $520 per prospect. If the marginal cost of a site survey were less than $520, the expected net benefit criterion would suggest adopting the site survey strategy and performing a site survey for all prospects in this class, given a choice between the two strategies.

The optimum set of actions under the phone survey strategy can be shown to be:

TABLE 7a

Optimal insurer offer

| | Condition | | |
|---|---|---|---|
| Age | a | b | c |
| A | rate 1 | rate 1 | rate 1 |
| B | rate 2 | rate 2 | rate 2 |
| C | rate 2 | rate 2 | rate 2 |

TABLE 7b

Expected net revenue given insurer optimal strategy

| | Condition | | |
|---|---|---|---|
| Age | a | b | c |
| A | 2400 | 1800 | 700 |
| B | 1000 | 1500 | −1800 |
| C | 1200 | 600 | −4800 |

This yields an expected payoff of $1025, and a value of information of $216 per prospect. If, for example, the marginal cost of a site survey were $600 and that of a phone survey were $100, the best of the three (simple) strategies according to the net benefit criterion would be the phone survey.

Since certain changes may be made in the above-described method for determining the prior net benefit of obtaining data relating to an individual risk in an insurance portfolio via a survey or similar procedure, without departing from the spirit and scope of the invention herein involved, it is intended that all of the subject matter of the above description or shown in the accompanying drawings shall be interpreted merely as examples illustrating the inventive concept herein and shall not be construed as limiting the invention.

What is claimed is:

1. A system for determining a priori benefit of conducting an insurance survey, said system comprising an automated data processor configured to perform the steps of:
    obtaining at least one probability distribution of information expected to be obtained by a survey, said information relating to at least one insurance risk; and
    determining an expected gross value of obtaining the information based at least in part on said at least one probability distribution and a profitability model associated with said information.

2. The system of claim 1, wherein said automated data processor is further configured for:
    determining a projected cost associated with conducting the survey; and
    determining a net value of obtaining the information as the expected gross value less the projected cost.

3. The system of claim 2, wherein said automated data processor is further configured for:
    determining whether to conduct the survey based at least in part on the net value.

4. The system of claim 3 wherein the gross value is further based at least in part on a retention model for said at least one insurance risk, said retention model incorporating information relating to terms of an insurance contract for said at least one insurance risk.

5. The system of claim 3, wherein said automated data processor is further configured for:

conducting the survey if the net value is a positive monetary value.

6. The system of claim 1 wherein the profitability model incorporates a risk model associated with said at least one insurance risk, said risk model setting forth an expected insurance loss of said at least one insurance risk given one or more characteristics of said at least one insurance risk.

7. The system of claim 6 wherein the risk model is a Bayesian predictive model.

8. An insurance survey development system comprising an automated data processor configured to perform the steps of:
    calculating the net value of obtaining information through a survey prior to carrying out the survey, said information relating to at least one insurance risk; and
    determining whether to conduct the survey based at least in part on the net value.

9. The system of claim 8, wherein calculating the net value of obtaining information includes the steps of:
    obtaining at least one probability distribution of the information to be obtained by the survey; and
    calculating an expected gross value of the information based at least in part on said at least one probability distribution and a profitability model associated with said information, wherein the net value is based at least in part on the expected gross value.

10. The system of claim 9, wherein calculating the net value of obtaining information includes the step of:
    determining a projected cost associated with conducting the survey, wherein the net value is calculated as the gross value less the cost.

11. The system of claim 10 wherein the gross value is further based at least in part on a retention model for said at least one insurance risk, said retention model incorporating information relating to terms of an insurance contact for said at least one insurance risk.

12. The system of claim 9 wherein the profitability model incorporates a risk model associated with said at least one insurance risk, said risk model setting forth an expected insurance loss of said at least one insurance risk given one or more characteristics of said at least one insurance risk.

13. The system of claim 12 wherein the risk model is a Bayesian predictive model.

14. The system of claim 8, wherein said automated data processor is further configured to perform the step of:
    conducting the survey if the net value is a positive monetary value.

15. An insurance survey development system comprising an automated data processor configured to perform the steps of:
    calculating a monetary value associated with information to be obtained by way of a survey procedure, prior to conducting the survey procedure, wherein the information relates to at least one insurance risk; and
    determining whether to conduct the survey based at least in part on the calculated monetary value.

16. The system of claim 15, wherein said automated data processor is further configured to perform the steps of:
    obtaining at least one probability distribution of said information; and
    calculating a gross value of the information based at least in part on said at least one probability distribution and a profitability model associated with said information, wherein the monetary value is a net value calculated based at least in part on the gross value.

17. The system of claim 16, wherein said automated data processor is further configured to perform the steps of:
    determining a cost associated with the survey procedure, wherein the net value is calculated as the gross value less the cost.

18. The system of claim 17 wherein the gross value is further based at least in part on a retention model for said at least one insurance risk, said retention model incorporating information relating to terms of an insurance contact for said at least one insurance risk.

19. The system of claim 16 wherein the profitability model incorporates a risk model associated with said at least one insurance risk, said risk model setting forth an expected insurance loss of said at least one insurance risk given one or more characteristics of said at least one insurance risk.

20. The system of claim 19 wherein the risk model is a Bayesian predictive model.

* * * * *